US012585798B2

(12) United States Patent
Hayashi

(10) Patent No.: US 12,585,798 B2
(45) Date of Patent: Mar. 24, 2026

(54) INFORMATION PROCESSING APPARATUS, NON-TRANSITORY COMPUTER READABLE MEDIUM STORING INFORMATION PROCESSING PROGRAM, AND INFORMATION PROCESSING METHOD FOR CHANGING AUTHORITY OF USER

(71) Applicant: FUJIFILM Business Innovation Corp., Tokyo (JP)

(72) Inventor: Koji Hayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 504 days.

(21) Appl. No.: 17/832,674

(22) Filed: Jun. 5, 2022

(65) Prior Publication Data

US 2023/0134567 A1    May 4, 2023

(30) Foreign Application Priority Data

Oct. 29, 2021    (JP) ................................. 2021-178141

(51) Int. Cl.
*G06F 21/60* (2013.01)
*H04N 1/00* (2006.01)
*H04N 1/44* (2006.01)

(52) U.S. Cl.
CPC ....... *G06F 21/604* (2013.01); *H04N 1/00514* (2013.01); *H04N 1/4433* (2013.01); *G06F 2221/2145* (2013.01)

(58) Field of Classification Search
None
See application file for complete search history.

(56) References Cited

U.S. PATENT DOCUMENTS

| | | | | |
|---|---|---|---|---|
| 9,450,958 | B1 * | 9/2016 | Saylor | ................... H04L 63/102 |
| 2020/0322347 | A1 * | 10/2020 | Goyal | .................. G06Q 10/101 |
| 2020/0358778 | A1 * | 11/2020 | Gopinathapai | ....... G06F 21/604 |

FOREIGN PATENT DOCUMENTS

| | | |
|---|---|---|
| JP | 2005301756 | 10/2005 |
| JP | 2009282994 | 12/2009 |
| JP | 2016143101 | 8/2016 |

OTHER PUBLICATIONS

"Notice of Reasons for Refusal of Japan Counterpart Application", issued on May 13, 2025, with English translation thereof, p. 1-p. 6.

* cited by examiner

*Primary Examiner* — Lennin R Rodriguezgonzalez
(74) *Attorney, Agent, or Firm* — JCIPRNET

(57) ABSTRACT

An information processing apparatus includes a processor configured to: receive an instruction to change an authority of a first user from a first authority to a second authority; and change the authority of the first user from the first authority to the second authority and change an authority of a second user who is under a control of the first user from the first authority.

11 Claims, 10 Drawing Sheets

| ROLE | AUTHORITY | USER | | | | |
|---|---|---|---|---|---|---|
| | | A | B | C | ← | ← |
| | | | | | D | E |
| SA | WITHOUT LIMITATION | O | | | | |
| CO1 | COLOR PRINTING UNAVAILABLE | | O | O | O | O |
| CO2 | COLOR PRINTING AVAILABLE | | | | | |
| : | : | | | | | |

| ROLE | AUTHORITY | USER | | | | |
|---|---|---|---|---|---|---|
| | | A | B | C | D | E |
| SA | WITHOUT LIMITATION | O | | | | |
| CO1 | COLOR PRINTING UNAVAILABLE | | O | O | O | O |
| CO2 | COLOR PRINTING AVAILABLE | | | | | |
| ⋮ | ⋮ | | | | | |

| ROLE | AUTHORITY | USER | | | | |
|---|---|---|---|---|---|---|
| | | A | B | C | D | E |
| SA | WITHOUT LIMITATION | O | | | | |
| CO1 | COLOR PRINTING UNAVAILABLE | | O | ↓ | ↓ | ↓ |
| CO2 | COLOR PRINTING AVAILABLE | | | O | O | O |
| ⋮ | ⋮ | | | | | |

| ROLE | AUTHORITY | USER | | | | |
| --- | --- | --- | --- | --- | --- | --- |
| | | A | B | C | ← | ← |
| | | | | | D | E |
| SA | WITHOUT LIMITATION | O | | | | |
| CO1 | COLOR PRINTING UNAVAILABLE | | O | O | O | O |
| CO2 | COLOR PRINTING AVAILABLE | | | | | |
| : | : | | | | | |

| ROLE | AUTHORITY | USER | | | | |
| --- | --- | --- | --- | --- | --- | --- |
| | | A | B | C | ← | ← |
| | | | | | D | E |
| SA | WITHOUT LIMITATION | O | | | | |
| CO1 | COLOR PRINTING UNAVAILABLE | | O | | | |
| CO2 | COLOR PRINTING AVAILABLE | | | O | O | O |
| : | : | | | | | |

Figure 10:
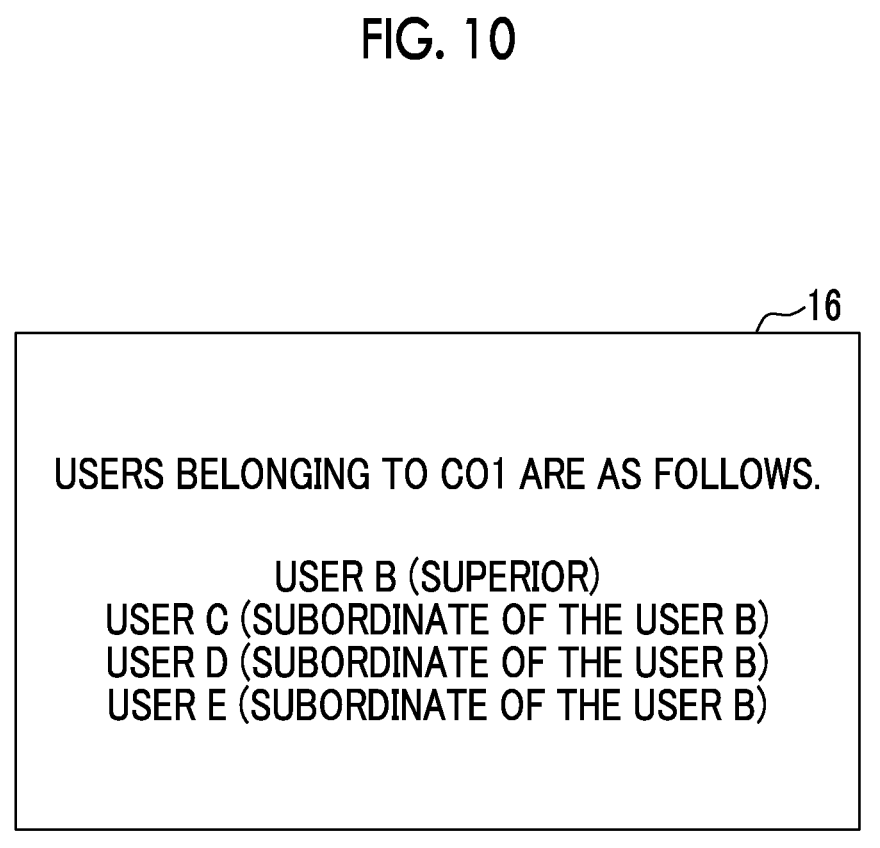

USERS BELONGING TO CO1 ARE AS FOLLOWS.

USER B (SUPERIOR)
USER C (SUBORDINATE OF THE USER B)
USER D (SUBORDINATE OF THE USER B)
USER E (SUBORDINATE OF THE USER B)

FIG. 12

| ROLE | | AUTHORITY | USER | | | | |
|---|---|---|---|---|---|---|---|
| | | | A | B | C | ←<br>D | ←<br>E |
| SA | | WITHOUT LIMITATION | O | | | | |
| CO1 | | COLOR PRINTING UNAVAILABLE | | O | O | O | O |
| CO2 | | COLOR PRINTING AVAILABLE | | | | | |
| ↑ | CO2-1 | COLOR PRINTING AVAILABLE + SINGLE-SIDED PRINTING UNAVAILABLE | | | | | |
| : | | : | | | | | |

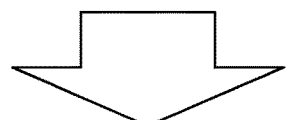

| ROLE | | AUTHORITY | USER | | | | |
|---|---|---|---|---|---|---|---|
| | | | A | B | C | ←<br>D | ←<br>E |
| SA | | WITHOUT LIMITATION | O | | | | |
| CO1 | | COLOR PRINTING UNAVAILABLE | | O | | | |
| CO2 | | COLOR PRINTING AVAILABLE | | | O | | |
| ↑ | CO2-1 | COLOR PRINTING AVAILABLE + SINGLE-SIDED PRINTING UNAVAILABLE | | | | O | O |
| : | | : | | | | | |

FIG. 13

| ROLE | | AUTHORITY | USER | | | | |
|---|---|---|---|---|---|---|---|
| | | | A | B | C | ← D | ← E |
| SA | | WITHOUT LIMITATION | O | | | | |
| CO1 | | COLOR PRINTING UNAVAILABLE | | O | O | O | O |
| CO2 | | COLOR PRINTING AVAILABLE | | | | | |
| ↑ | CO2-1 | COLOR PRINTING AVAILABLE + SINGLE-SIDED PRINTING UNAVAILABLE | | | | | |
| ⋮ | | ⋮ | | | | | |

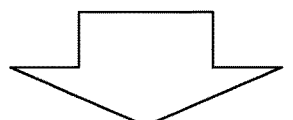

| ROLE | | AUTHORITY | USER | | | | |
|---|---|---|---|---|---|---|---|
| | | | A | B | C | ← D | ← E |
| SA | | WITHOUT LIMITATION | O | | | | |
| CO1 | | COLOR PRINTING UNAVAILABLE | | O | | | |
| CO2 | | COLOR PRINTING AVAILABLE | | | O | | |
| ↑ | CO2-1 | COLOR PRINTING AVAILABLE + SINGLE-SIDED PRINTING UNAVAILABLE | | | | O | O |
| ⋮ | | ⋮ | | | | | |

INFORMATION PROCESSING APPARATUS, NON-TRANSITORY COMPUTER READABLE MEDIUM STORING INFORMATION PROCESSING PROGRAM, AND INFORMATION PROCESSING METHOD FOR CHANGING AUTHORITY OF USER

CROSS-REFERENCE TO RELATED APPLICATIONS

This application is based on and claims priority under 35 USC 119 from Japanese Patent Application No. 2021-178141 filed Oct. 29, 2021.

BACKGROUND

(i) Technical Field

The present invention relates to an information processing apparatus, a non-transitory computer readable medium storing an information processing program, and an information processing method.

(ii) Related Art

JP2005-301756A discloses an access control program for controlling access from a user to objects that are information resources. This access control program causes a computer to perform a procedure for acquiring a role corresponding to a user who has requested access from a role management unit that manages roles in which target object information and target operation information are registered. Further, this access control program causes the computer to perform a procedure for determining an operation permitted to the user for the object on the basis of the acquired role.

SUMMARY

In a case where the authority of a first user is to be changed, there is a problem that the authority of a second user should be changed individually even though an authority identical to the authority of the first user before the change of an authority, is given to the second user who is under the control of the first user.

Aspects of non-limiting embodiments of the present disclosure relate to an information processing apparatus, a non-transitory computer readable medium storing an information processing program, and an information processing method that may change the authority of a second user without individually changing of the authority of the second user in a case where the authority of a first user is changed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus includes a processor configured to: receive an instruction to change an authority of a first user from a first authority to a second authority; and change the authority of the first user from the first authority to the second authority and change an authority of a second user who is under a control of the first user from the first authority.

BRIEF DESCRIPTION OF THE DRAWINGS

Exemplary embodiment(s) of the present invention will be described in detail based on the following figures, wherein:

FIG. 10 is a schematic diagram showing an example of an affiliated user list screen according to an exemplary embodiment;

FIG. 12 is a schematic diagram showing an example of a case where the invention according to the first exemplary embodiment is applied in a case where the authority of the second user is to be changed to an authority different from the authority of the first user; and FIG. 13 is a schematic diagram showing an example of a case where an invention according to the second exemplary embodiment is applied in a case where the authority of the second user is to be changed to an authority different from the authority of the first user.

DETAILED DESCRIPTION

First Exemplary Embodiment

Figures 1, 2:
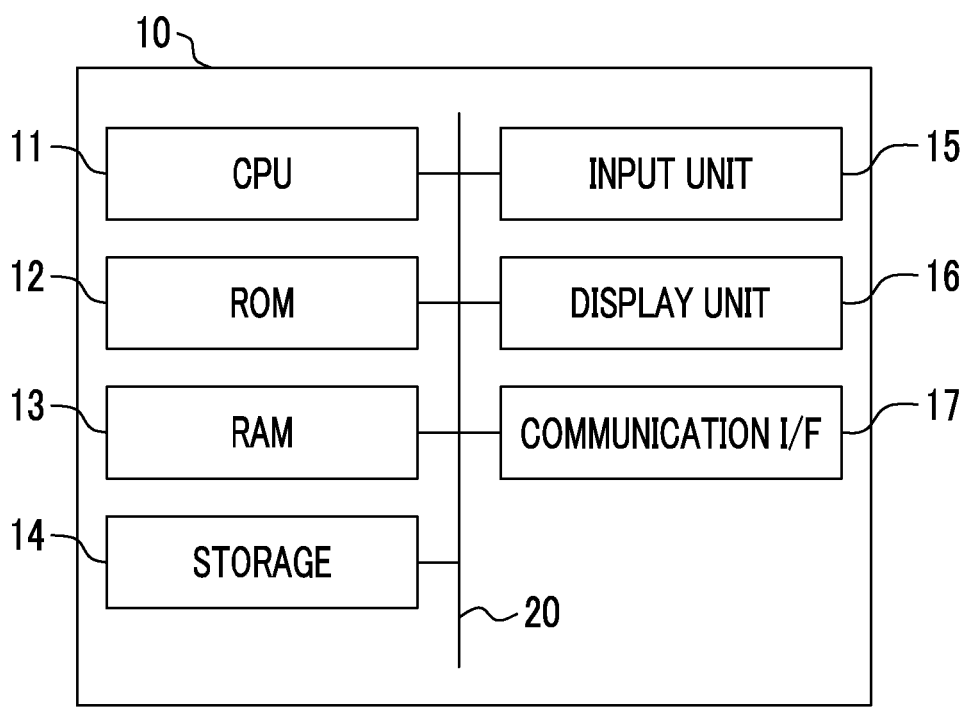
FIG. 1 is a schematic diagram showing an example of the hardware configuration of an information processing apparatus according to an exemplary embodiment.
FIG. 2 is a schematic diagram showing an example of the configuration of a user database according to the exemplary embodiment.

An example of an exemplary embodiment of a technique of the present invention will be described below with reference to the drawings. In the respective drawings, identical or equivalent components and portions will be denoted by identical reference numerals. Further, since the scales of the drawings are exaggerated for convenience of description, there is a case where the scales are different from actual scales.

FIG. 1 is a block diagram showing the hardware configuration of an information processing apparatus 10 according to an exemplary embodiment of a technique of the present invention. The information processing apparatus 10 according to the exemplary embodiment is a digital multifunction printer that has, for example, an image printing function, an image scanning function, an image transmission function, and the like. However, the information processing apparatus is not limited to this example. For example, a personal computer and the like may be applied as the information processing apparatus 10.

As shown in FIG. 1, the information processing apparatus 10 includes various components, such as a central processing unit (CPU) 11, a read only memory (ROM) 12, a random access memory (RAM) 13, a storage 14, an input unit 15, a display unit 16, and a communication interface (communication I/F) 17. The respective components are connected to each other to be capable of communicating with each other via a bus 20.

The CPU 11 is a central processing unit, and executes various programs or controls the respective parts. That is, the CPU 11 reads out programs from the ROM 12 or the storage 14 and executes the programs using the RAM 13 as a work area. The CPU 11 controls the respective components and performs various types of arithmetic processing according to the programs recorded in the ROM 12 or the storage 14. In the exemplary embodiment, an information processing program and a display processing program are stored in the ROM 12 or the storage 14.

The ROM 12 stores various programs and various data. The RAM 13 temporarily stores programs or data as a work area. The storage 14 is composed of a hard disk drive (HDD) or a solid state drive (SSD), and stores various programs including an operating system and various data. In the exemplary embodiment, a user database 14A is stored in the storage 14. The details of the user database 14A will be described later.

The input unit 15 includes a pointing device, such as a mouse, and a keyboard, and is used to perform various inputs. The display unit 16 is, for example, a liquid crystal display and displays various types of information. The display unit 16 may adopt a touch panel system and function as the input unit 15.

The communication interface 17 is an interface that is used to communicate with other devices. For example, standards, such as ETHERNET (registered trademark), FDDI, and Wi-Fi (registered trademark), are used for the communication interface 17.

In addition to the components shown in FIG. 1, the information processing apparatus 10 includes a device state detection unit that detects the state of the information processing apparatus 10, an application management unit that manages application software which can be used by the information processing apparatus 10, a USB device communication unit that is used to communicate with an external device, such as a universal serial bus (USB) memory, and a power supply unit that supplies power to the information processing apparatus 10. The USB device communication unit includes an IC card scanning device that scans an integrated circuit (IC) card and an externally connected device, such as a medium reader. In addition to the components shown in FIG. 1, the information processing apparatus 10 further includes a scanner unit that scans the image of a document set up in the information processing apparatus 10 and generates image data, a printing unit that performs printing on the basis of the image data, and a facsimile communication unit that communicates image data through a communication line, such as a phone line. In addition to the components shown in FIG. 1, the information processing apparatus 10 further includes a user management unit that manages users who can use the information processing apparatus 10, a role management unit that manages roles to be described later, and an internet service that is used to be connected to the Internet.

Next, the user database 14A according to the exemplary embodiment will be described with reference to FIG. 2. In the user database 14A shown in FIG. 2, various types of information, such as a role, an authority, and a user, are associated with each other.

The role is information that represents a role corresponding to an authority related to the use of the information processing apparatus 10. The authority is information that represents an authority related to the use of the information processing apparatus 10. The user is information that represents a user belonging to the associated role. Further, in the example shown in FIG. 2, a user D and a user E are under the control of a user C. Specifically, the user D and the user E are subordinates of the user C. Furthermore, in the example shown in FIG. 2, a user A belongs to a role SA, and a user B, a user C, a user D, and a user E belong to a role CO1. In other words, the user A can use the information processing apparatus 10 without limitation and the user B, the user C, the user D, and the user E cannot use the color printing function of the information processing apparatus 10.

Next, the action of the information processing apparatus 10 will be described.

Figure 3:
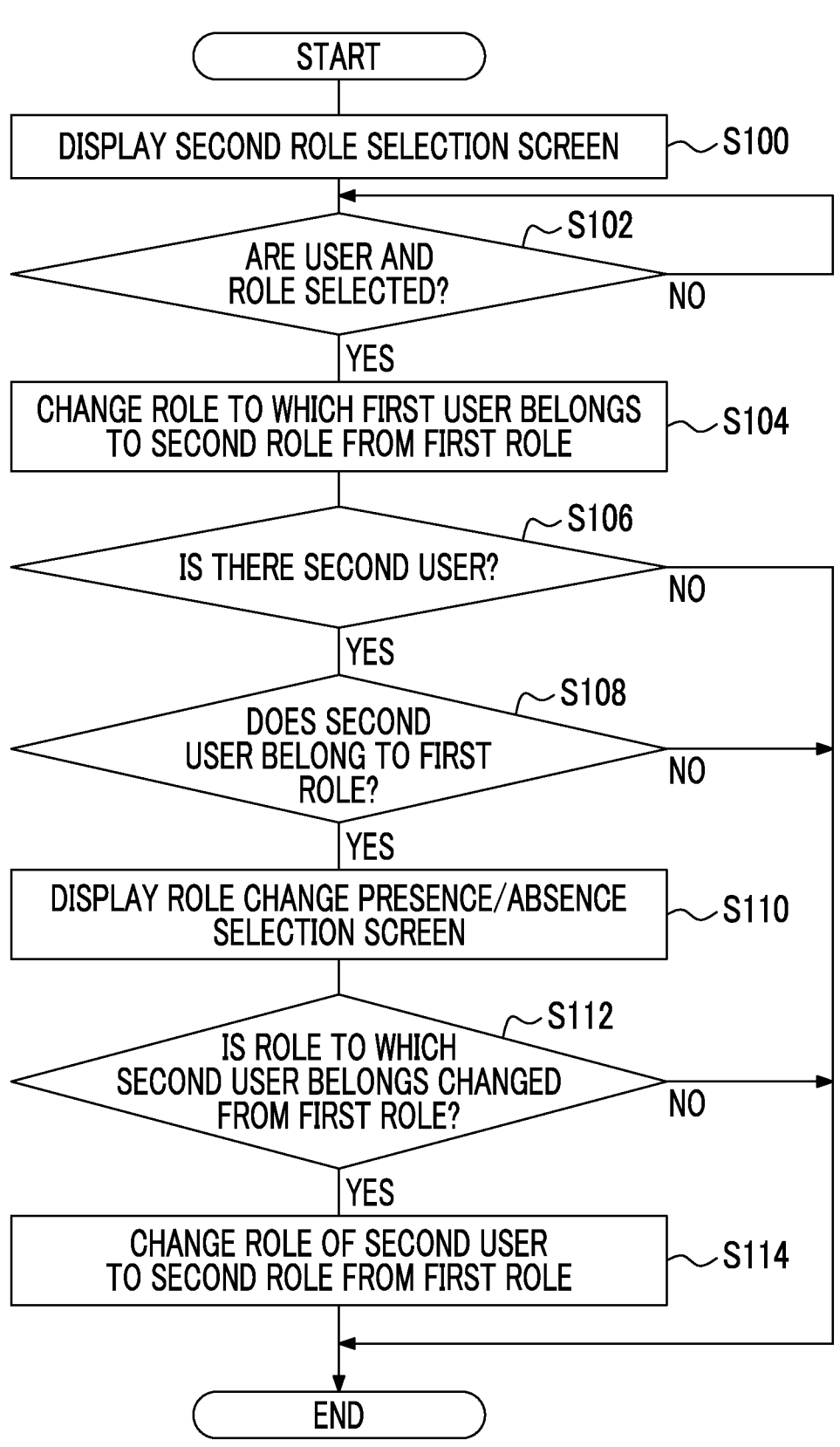
FIG. 3 is a flowchart showing an example of information processing according to a first exemplary embodiment.

FIG. 3 is a flowchart showing the flow of information processing that is performed by the information processing apparatus 10. The CPU 11 reads out an information processing program from the ROM 12 or the storage 14 and develops the information processing program in the RAM 13 to execute the information processing program, so that information processing is performed.

In Step S100 of FIG. 3, the CPU 11 displays a second role selection screen according to a predetermined format on the display unit 16.

Figure 4:
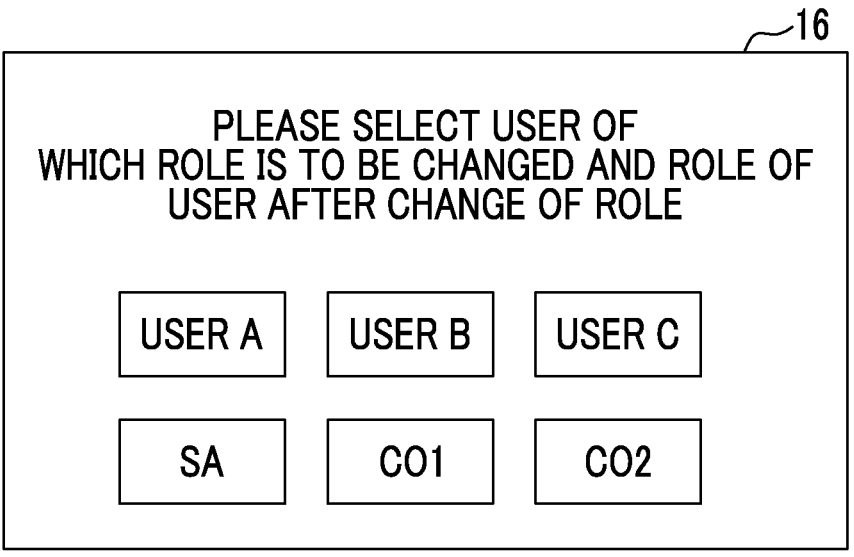
FIG. 4 is a schematic diagram showing an example of a second role selection screen according to an exemplary embodiment.

As shown in FIG. 4, a message prompting a user to select a user of which a role is to be changed and the role of the user after the change of a role is displayed on the second role selection screen according to the exemplary embodiment.

In Step S102, the CPU 11 waits until receiving the selection of the user of which a role is to be changed and the role of the user after the change of a role on the second role selection screen through the input unit 15. In a case where the CPU 11 receives the selection of the user of which a role is to be changed and the role of the user after the change of a role on the second role selection screen through the input unit 15 (YES in Step S102), the CPU 11 proceeds to Step S104. In the following description, the user of which the selection is received on the second role selection screen by the CPU 11 will be referred to as a first user. Further, in the following description, a role to which the first user has belonged before the change of the role will be referred to as a first role, and a role to which the first user belongs after the change of the role, in other words, a role of which the selection is received on the second role selection screen by the CPU 11 will be referred to as a second role. Further, in the following description, an authority associated with the first role will be referred to as a first authority and an authority associated with the second role will be referred to as a second authority. That is, in a case where the CPU 11 receives an instruction to change the authority of the first user from the first authority to the second authority (YES in Step S102), the CPU 11 proceeds to Step S104.

In the exemplary embodiment, an authority, which is associated with the first authority and is limited from the first authority, is applied as the second authority. Specifically, in the exemplary embodiment, in a case where an authority allowing a user to use the color printing function of the information processing apparatus 10 is applied as the first authority, an authority not allowing a user to use the color printing function of the information processing apparatus 10 is applied as the second authority. However, the second authority is not limited to this example. For example, an authority not associated with the first authority, an authority not limited from the first authority, or the like may be applied as the second authority. Specifically, in a case where an authority not allowing a user to use the color printing function of the information processing apparatus 10 is applied as the first authority, an authority allowing a user to manage a user who can use the information processing apparatus 10, an authority allowing a user to use the color printing function of the information processing apparatus 10, or the like may be applied as the second authority.

In Step S104, the CPU 11 changes a role to which the first user belongs from the first role to the second role. In other words, the CPU 11 changes the authority of the first user from the first authority to the second authority.

In Step S106, the CPU 11 reads out the user database 14A and determines whether or not there is a second user under the control of the first user. In a case where there is a second user (YES in Step S106), the CPU 11 proceeds to Step S108. On the other hand, in a case where there is no second user (NO in Step S106), the CPU 11 ends this information processing.

In Step S108, the CPU 11 determines whether or not the second user belongs to the first role. In other words, the CPU 11 determines whether or not the second user has the first authority. Ina case where the second user belongs to the first role (YES in Step S108), the CPU 11 proceeds to Step S110. On the other hand, in a case where the second user does not belong to the first role (NO in Step S108), the CPU 11 ends this information processing. In a case where there are a plurality of second users and at least one second user belongs to the first role, the CPU 11 proceeds to Step S108. Then, in a case where all of the second users do not belong to the first role, the CPU 11 ends this information processing.

In Step S110, the CPU 11 displays a role change presence/absence selection screen according to a predetermined format on the display unit 16.

Figure 5:
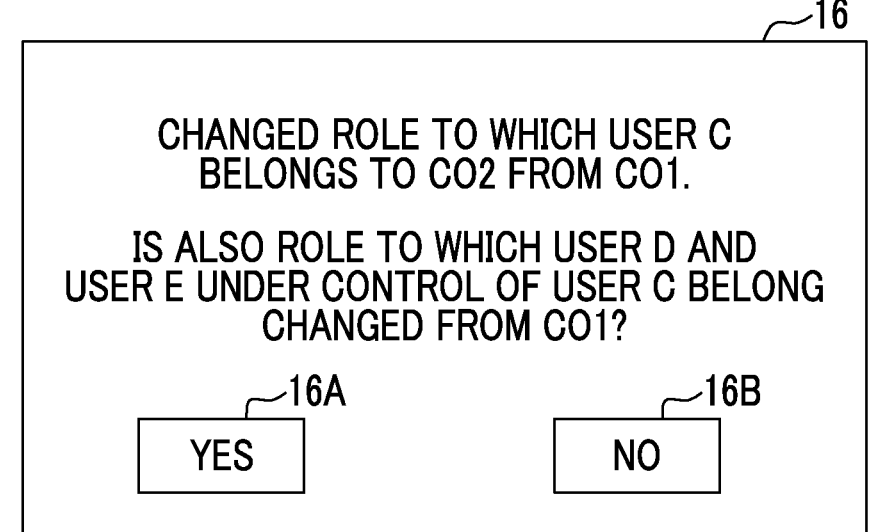
FIG. 5 is a schematic diagram showing an example of a role change presence/absence selection screen according to an exemplary embodiment.

As shown in FIG. 5, a message prompting a user to select whether or not to change a role to which the second user (the user D and the user E in an example shown in FIG. 5) belongs from the first role (CO1 in an example shown in FIG. 5) is displayed on the role change presence/absence selection screen according to the exemplary embodiment. In a case where the user is to change the role to which the second user belongs from the first role, the user selects a YES button 16A through the input unit 15. In a case where the user is not to change the role to which the second user belongs from the first role, the user selects a NO button 16B through the input unit 15. In other words, in a case where the user is to change the authority of the second user from the first authority, the user selects the YES button 16A through the input unit 15. In a case where the user is not to change the authority of the second user from the first authority, the user selects the NO button 16B through the input unit 15.

In Step S112, the CPU 11 determines whether or not selection to change the role to which the second user belongs from the first role is received. In other words, the CPU 11 determines whether or not the selection of the YES button 16A on the role change presence/absence selection screen has been received through the input unit 15. In a case where the CPU 11 receives selection to change the role to which the second user belongs from the first role (YES in Step S112), the CPU 11 proceeds to Step S112. On the other hand, in a case where the CPU 11 receives the selection not to change the role to which the second user belongs from the first role (NO in Step S112), the CPU 11 ends this information processing. In other words, in a case where the CPU 11 receives the selection not to change the authority of the second user from the first authority, the CPU 11 does not change the authority of the second user from the first authority.

In Step S114, the CPU 11 changes the role to which the second user belongs to the second role from the first role. In other words, the CPU 11 changes the authority of the second user from the first authority to the second authority. Then, the CPU 11 ends this information processing.

Figure 6:
FIG. 6 is a schematic diagram showing an example of a case where an invention according to the first exemplary embodiment is not applied in a case where the authority of a second user is to be changed to an authority identical to the authority of a first user.
Figure 7:
FIG. 7 is a schematic diagram showing an example of a case where the invention according to the first exemplary embodiment is applied in a case where the authority of the second user is to be changed to an authority identical to the authority of the first user.

Next, in a case where the authority of the second user is to be changed from the first authority to the second authority as in the case of the first user, a case where an invention according to the first exemplary embodiment is not applied and a case where the invention according to the first exemplary embodiment is applied will be compared with each other using FIGS. 6 and 7.

As shown in FIG. 6, in a case where a user A belongs to a role SA, a user B, a user C, a user D, and a user E belong to a role CO1, a role to which the user C and the users D and E under the control of the user C belong is changed from CO1 to CO2, and the invention according to the first exemplary embodiment is not applied, it is necessary to change roles individually.

On the other hand, as shown in FIG. 7, in a case where the invention according to the first exemplary embodiment is applied, the role to which the user C and the users D and E under the control of the user C belong can be changed from CO1 to CO2 without the individual change of roles.

Next, the flow of display processing, which is performed by the information processing apparatus 10, will be described with reference to FIG. 8. The CPU 11 reads out a display processing program from the ROM 12 or the storage 14 and develops the display processing program in the RAM 13 to execute the display processing program, so that display processing is performed.

Figure 8:
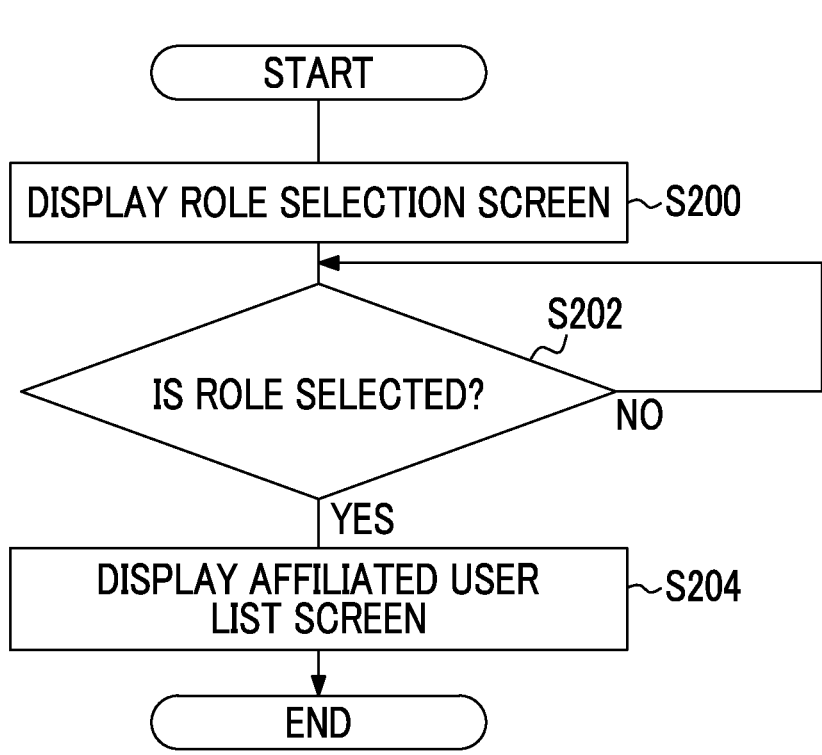
FIG. 8 is a flowchart showing an example of display processing according to an exemplary embodiment.

In Step S200 of FIG. 8, the CPU 11 displays a role selection screen according to a predetermined format on the display unit 16.

Figure 9:
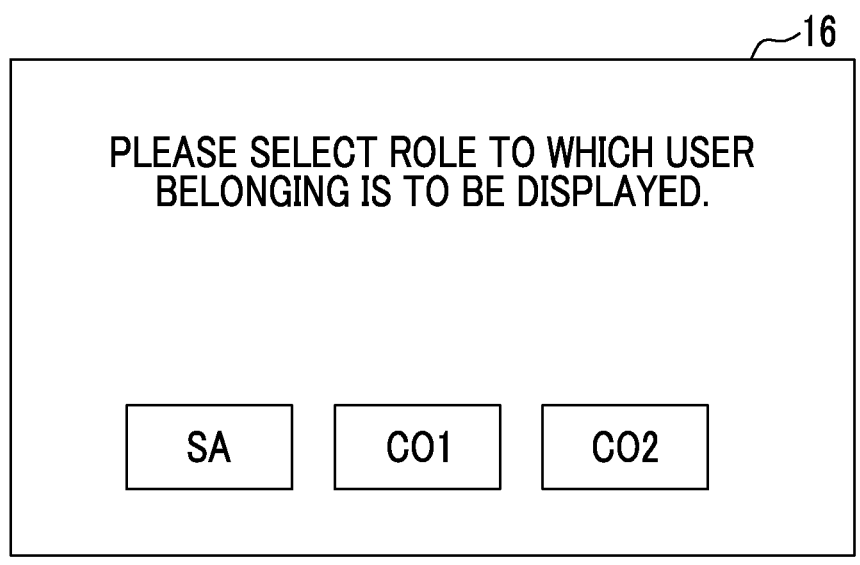
FIG. 9 is a schematic diagram showing an example of a role selection screen according to an exemplary embodiment.

As shown in FIG. 9, a message prompting a user to select a role to which a user belonging is to be displayed is displayed on the role selection screen according to the exemplary embodiment.

In Step S202, the CPU 11 waits until receiving the selection of any role on the role selection screen through the input unit 15. In a case where the CPU 11 receives the selection of any role on the second role selection screen through the input unit 15 (YES in Step S202), the CPU 11 proceeds to Step S204.

In Step S204, the CPU 11 displays an affiliated user list screen according to a predetermined format on the display unit 16. Then, the CPU 11 ends this display processing.

As shown in FIG. 10, users (the user B, the user C, the user D, and the user E in an example shown in FIG. 10) belonging to a role (CO1 in the example shown in FIG. 10) selected on the role selection screen are displayed on the affiliated user list screen according to the exemplary embodiment. Further, the affiliated user list screen according to the exemplary embodiment displays that users are under the control of a certain user among the users belonging to the role selected on the role selection screen. For example, the example shown in FIG. 10 shows that the user B is a superior and the users C, D, and E are subordinates of the user B. In other words, the example shown in FIG. 10 shows that the users C, D, and E are under the control of the user B.

Second Exemplary Embodiment

In the first exemplary embodiment, in a case where the CPU 11 receives an instruction to change the authority of the first user from the first authority to the second authority, the CPU 11 changes the authority of the second user from the first authority to the second authority. In a second exemplary embodiment, in a case where the CPU 11 receives an instruction to change the authority of the first user from the first authority to the second authority and there is no predetermined authority of the second user after the change of an authority, the CPU 11 changes the authority of the second user from the first authority to the second authority. A difference between the first exemplary embodiment and the second exemplary embodiment will be described below. Since the hardware configuration of the second exemplary embodiment is identical to the hardware configuration of the first exemplary embodiment, the description thereof will be omitted. Further, since the flow of display processing of the second exemplary embodiment is also identical to the flow of display processing of the first exemplary embodiment, the description thereof will be omitted.

Figure 11:
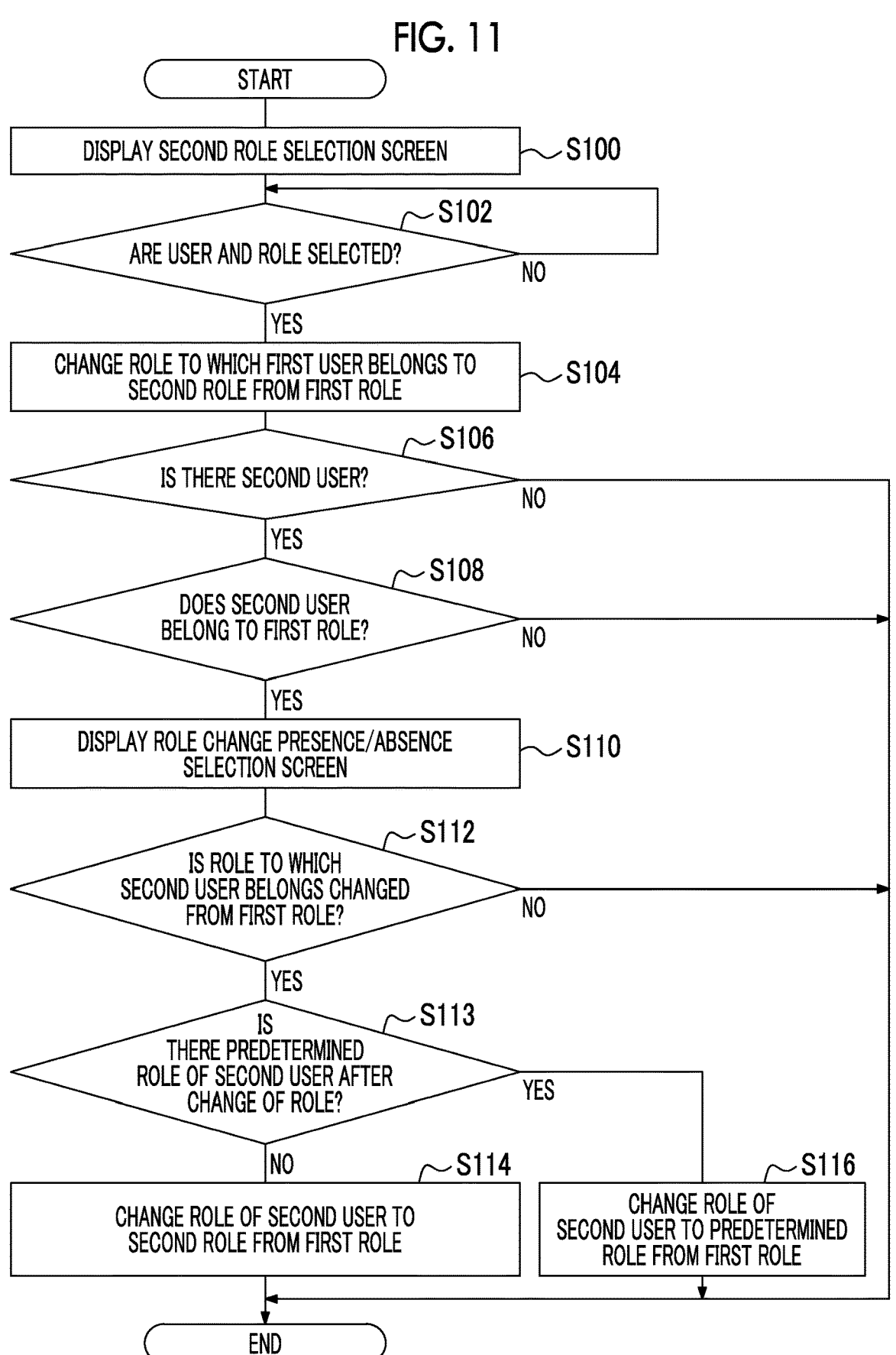
FIG. 11 is a flowchart showing an example of information processing according to a second exemplary embodiment.

A flowchart showing the flow of information processing that is performed by an information processing apparatus 10 according to the exemplary embodiment is shown in FIG. 11. Steps of performing processing identical to the flow of information processing shown in FIG. 3 will be denoted by step numbers identical to step numbers shown in FIG. 3, and the description thereof will be omitted.

In the flow of information processing shown in FIG. 11, the processing of Steps S113 and S116 is added to the flow of information processing shown in FIG. 3.

In Step S113 of FIG. 11, the CPU 11 determines whether or not there is a predetermined role of the second user after the change of a role. In other words, the CPU 11 determines whether or not there is a predetermined authority of the second user after the change of an authority. In a case where there is a predetermined role of the second user after the change of a role (YES in Step S113), the CPU 11 proceeds to Step S116. On the other hand, in a case where there is no predetermined role of the second user after the change of a role (NO in Step S113), the CPU 11 proceeds to Step S114. In other words, in a case where there is no predetermined authority of the second user after the change of an authority, the CPU 11 changes the authority of the second user from the first authority to the second authority. However, processing is not limited to this example. For example, in a case where there is no predetermined authority of the second user after the change of an authority, the CPU 11 may not change the authority of the second user from the first authority.

In Step S116, the CPU 11 changes the role of the second user to from the first role the predetermined role of the second user after the change of a role. In other words, the CPU 11 changes the authority of the second user from the first authority to the predetermined authority of the second user after the change of an authority. Then, the CPU 11 ends this information processing.

In the exemplary embodiment, a third role that is a role associated with a third authority is applied as the predetermined role of the second user after the change of a role. The third authority is an authority that is associated with the second authority and limited from the second authority. Specifically, in the exemplary embodiment, in a case where an authority allowing a user to use the color printing function of the information processing apparatus 10 is applied as the second authority, an authority allowing a user to use the color printing function of the information processing apparatus 10 but not to use single-sided printing is applied as the third authority. However, the predetermined authority of the second user after the change of an authority is not limited to this example. For example, an authority not associated with the second authority, an authority not limited from the second authority, or the like may be applied as the predetermined authority of the second user after the change of an authority. Specifically, in a case where an authority not allowing a user to use the color printing function of the information processing apparatus 10 is applied as the second authority, an authority allowing a user to use the single-sided printing function of the information processing apparatus 10, an authority allowing a user to use the color printing function of the information processing apparatus 10, or the like may be applied as the predetermined authority of the second user after the change of an authority.

Next, in a case where the authority of the second user is to be changed to an authority different from the authority of the first user, a case where the invention according to the first exemplary embodiment is applied and a case where the invention according to the second exemplary embodiment is applied will be compared with each other using FIGS. 12 and 13.

As shown in FIG. 12, in a case where a user A belongs to a role SA, a user B, a user C, a user D, and a user E belong to a role CO1, the invention according to the first exemplary embodiment is applied, and a role to which the user C belongs is changed to CO2, a role to which the users D and E under the control of the user C belong is also changed to CO2. Accordingly, in a case where the role to which the users D and E belong is changed to CO2-1 other than CO2, it is necessary to change roles individually.

On the other hand, as shown in FIG. 13, in a case where CO2-1 is predetermined as the role of the users D and E after the change of a role and the invention according to the second exemplary embodiment is applied, a role to which the users D and E belong can be changed from CO1 to CO2-1 without the individual change of roles.

In the exemplary embodiment, in a case where there are a plurality of second users, the CPU 11 changes all of roles, to which the plurality of second users belong, to the identical role. However, the predetermined authority of the second user after the change of an authority is not limited to this example. For example, in a case where there are a plurality of second users, the CPU 11 may change roles, to which the plurality of second users belong, to different roles.

The exemplary embodiments have been described above, but the technical scope of the present invention is not limited to the scope described in the above-mentioned exemplary embodiments. The exemplary embodiments can have various changes or improvements without departing from the scope of the invention, and embodiments including the changes or improvements are also included in the technical scope of the present invention.

Further, the exemplary embodiments do not limit the inventions according to claims, and not all of the combinations of features described in the exemplary embodiments are necessary for means for addressing the problems of the invention. The above-mentioned exemplary embodiments include inventions at various stages, and various inventions are extracted from the combinations of a plurality of disclosed components. As long as effects are obtained even though some components are deleted from all the components disclosed in the exemplary embodiments, configuration from which these some components are deleted may be extracted as an invention.

For example, in a case where the CPU 11 receives the selection of whether or not to change the authority of the second user from the first authority and receives selection to change the authority of the second user from the first authority, the CPU 11 changes the authority of the second user from the first authority in the respective exemplary embodiments. However, the predetermined authority of the second user after the change of an authority is not limited to this example. For example, the CPU 11 may change the authority of the second user from the first authority regardless of whether or not selection to change the authority of the second user from the first authority is received.

Further, in a case where the authority of the second user is an authority identical to the authority of the first user, the CPU 11 changes the authority of the second user together with the authority of the first user in the respective exemplary embodiments. However, the predetermined authority of the second user after the change of an authority is not limited to this example. For example, the CPU 11 may change the authority of the second user together with the authority of the first user regardless of whether or not the authority of the second user is an authority identical to the authority of the first user. Furthermore, in a case where the authority of the second user is an authority limited from the authority of the first user, the CPU 11 may change the authority of the second user together with the authority of the first user.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Aspects in which the information processing program and the display processing program are installed in the ROM 12 or the storage 14 have been described in the exemplary embodiments, but the present invention is not limited thereto. The information processing program and the display processing program according to the exemplary embodiment may be provided in forms where the information processing program and the display processing program are recorded on a computer-readable storage medium. For example, the information processing program and the display processing program according to the exemplary embodiment may be provided in forms where the information processing program and the display processing program are recorded on optical discs, such as a compact disc (CD)-ROM and a digital versatile disc (DVD)-ROM, or forms where the information processing program and the display processing program are recorded on semiconductor memories, such as a universal serial bus (USB) memory and a memory card. Further, the information processing program and the display processing program according to the exemplary embodiment may be acquired from an external device through the communication interface 17.

Furthermore, a case where the information processing and the display processing are realized by software configuration using a computer through the execution of programs has been described in the above-mentioned exemplary embodiment, but the present invention is not limited thereto. For example, an aspect in which the information processing and the display processing are realized by hardware configuration or a combination of hardware configuration and software configuration may be provided.

In addition, the configuration of the information processing apparatus 10 described in the above-mentioned exemplary embodiments is an example, and it goes without saying that unnecessary portions may be deleted or new portions may be added without departing from the scope of the present invention.

Further, the flows (see FIGS. 3 and 11) of the processing of the information processing programs described in the above-mentioned exemplary embodiments are examples, and it goes without saying that unnecessary steps may be deleted, new steps may be added, or the order of processing may be changed without departing from the scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
      receive an instruction to change an authority of a first user from a first authority to a second authority;
      access a user database to determine whether a second user is controlled by the first user;
      in response to having determined that the second user is controlled by the first user, determine whether the second user has the first authority;
      in response to having determined that the second user has the first authority, change the authority of the second user in a case where the processor has received a selection to change the authority of the second user from the first authority; and
      not to change the authority of the second user from the first authority in a case where the processor receives the selection not to change the authority of the second user from the first authority.

2. The information processing apparatus according to claim 1, wherein the processor is further configured to:
   change the authority of the second user from the first authority to the second authority.

3. The information processing apparatus according to claim 2, wherein the processor is further configured to:
   not to change the authority of the second user from the first authority in a case where the processor receives the selection not to change the authority of the second user from the first authority.

4. The information processing apparatus according to claim 1, wherein the processor is further configured to:
   change the authority of the second user from the first authority to the second authority in a case where the processor has received the selection to change the authority of the second user from the first authority and there is no predetermined authority of the second user after a change of the authority.

5. The information processing apparatus according to claim 4, wherein the processor is further configured to:

not to change the authority of the second user from the first authority in a case where the processor receives the selection not to change the authority of the second user from the first authority.

6. The information processing apparatus according to claim 1, wherein the processor is further configured to:

change the authority of the first user from the first authority to the second authority and change the authority of the second user from the first authority to a third authority different from the second authority.

7. The information processing apparatus according to claim 6, wherein the second authority is an authority associated with the first authority and limited from the first authority, and the third authority is an authority associated with the second authority and limited from the second authority.

8. The information processing apparatus according to claim 7, wherein the processor is further configured to:

not to change the authority of the second user from the first authority in a case where the processor receives the selection not to change the authority of the second user from the first authority.

9. The information processing apparatus according to claim 6, wherein the processor is further configured to:

not to change the authority of the second user from the first authority in a case where the processor receives the selection not to change the authority of the second user from the first authority.

10. A non-transitory computer readable medium storing an information processing program causing a computer to execute a process comprising:

receiving an instruction to change an authority of a first user from a first authority to a second authority;

accessing a user database to determine whether a second user is controlled by the first user;

in response to having determined that the second user is controlled by the first user, determining whether the second user has the first authority;

in response to having determined that the second user has the first authority, changing the authority of the second user in a case where the processor has received a selection to change the authority of the second user from the first authority; and not to change the authority of the second user from the first authority in a case where the processor receives the selection not to change the authority of the second user from the first authority.

11. An information processing method comprising:

receiving an instruction to change an authority of a first user from a first authority to a second authority;

accessing a user database to determine whether a second user is controlled by the first user;

in response to having determined that the second user is controlled by the first user, determining whether the second user has the first authority;

in response to having determined that the second user has the first authority, changing the authority of the second user in a case where the processor has received a selection to change the authority of the second user from the first authority;

not to change the authority of the second user from the first authority in a case where the processor receives the selection not to change the authority of the second user from the first authority.

* * * * *